C. E. COX.
CLUTCH DISK.
APPLICATION FILED JAN. 6, 1911.

991,482.

Patented May 9, 1911.

Witnesses
Frank A. Fahl
Thomas W. McMeans

Inventor
Claude E. Cox,
By Bradford Hood
Attorneys.

UNITED STATES PATENT OFFICE.

CLAUDE E. COX, OF MINNEAPOLIS, MINNESOTA.

CLUTCH-DISK.

991,482.　　　　　Specification of Letters Patent.　　Patented May 9, 1911.

Application filed January 6, 1911. Serial No. 601,064.

*To all whom it may concern:*

Be it known that I, CLAUDE E. COX, a citizen of the United States, residing at Minneapolis, in the county of Hennepin and State of Minnesota, have invented a new and useful Clutch-Disk, of which the following is a specification.

It has heretofore been customary to produce friction clutches, especially for use in automobiles, by means of two series of alternately placed friction rings, one series of said rings having a plurality of radially extending fingers projecting from the external periphery, and the other series having a similar series of radially extending fingers projecting from the inner periphery, the fingers of each series lying between longitudinally extending fingers connected to the driving and driven elements, respectively. In the operation of such a clutch, it is found that the thin radially projecting fingers ultimately wear notches in the faces of the retaining fingers of the driving and driven elements, and, in course of time, these notches become so deep as to seriously interfere with the efficient interaction of the friction rings.

The object of my present invention is to produce clutch rings of this general type of such form as to avoid this improper notching of the engaging fingers.

The accompanying drawings illustrate my invention.

Figure 1:
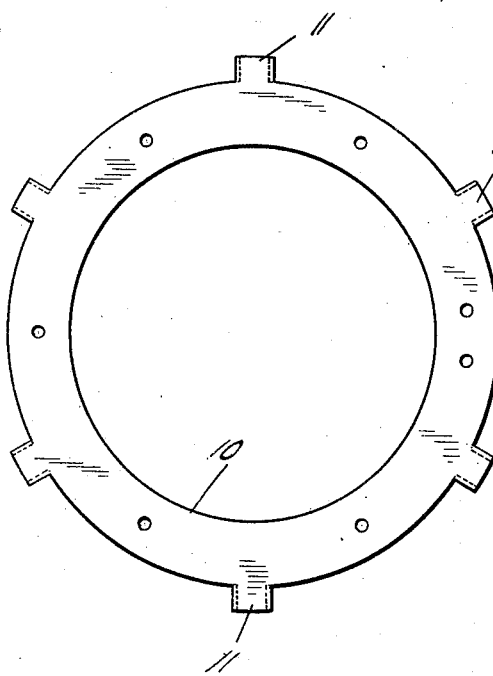
Figure 2:
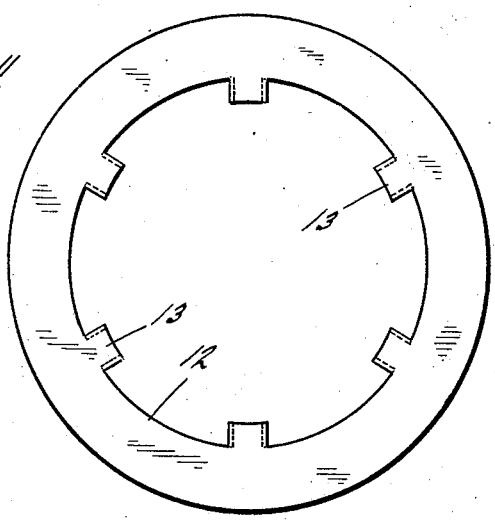
Figure 3:
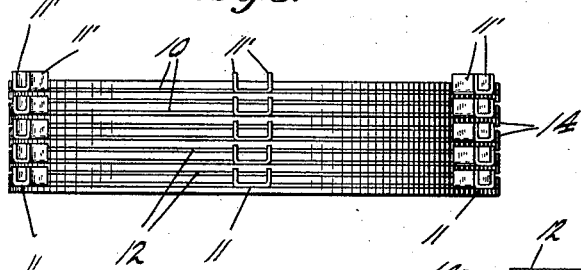

Figure 1 is a face elevation of a ring of one series; Fig. 2 a similar view of a ring of another series; Fig. 3 a plan of a group of the two series with the rings of one series provided upon their opposite faces with friction facings, and Fig. 4 a diametrical section of the parts shown in Fig. 3.

Figure 4:
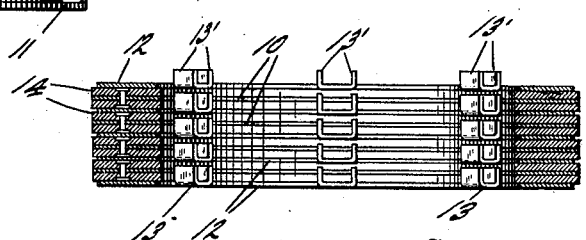

In the drawings, 10 indicates a thin sheet metal ring provided upon its outer periphery with a plurality of radially extending fingers 11. In cutting the blank for this ring I form, at each side of each finger 11, a short wing 11' which is then bent at right angles to the plate as clearly shown in Fig. 3. Adapted to be alternately placed between the rings 10 are similar rings 12 each provided upon its inner periphery with radially projecting fingers 13 which likewise are provided with wings 13' bent at right angles to the face of the plate. In the present form I have shown each of the rings 10 provided on each face with a facing of friction material 14 and when such a friction facing is provided, the wings 11' and 13' may be somewhat elongated, just enough space being left, when the parts are nested as shown in Figs. 3 and 4, to allow for some wear of the friction facings before the wings of one ring will contact with the fingers of the adjacent ring of the same group. By this arrangement, I produce a finger having an enlarged bearing surface so that the load of each ring is distributed upon the retaining arms (not shown) between which the said fingers are projected.

I claim as my invention:

1. A friction ring for clutches consisting of a main annular sheet metal body having a plurality of radially projecting fingers, each of said fingers having a pair of flanking wings bent substantially at right angles to the main body of the finger.

2. A friction ring for clutches consisting of a main annular sheet metal body having a plurality of radially projecting fingers, said fingers having flanking wings bent substantially at right angles to the main body of the fingers.

In witness whereof, I, CLAUDE E. COX have hereunto set my hand and seal at Minneapolis, Minnesota, this 31st day of December, A. D. one thousand nine hundred and ten.

CLAUDE E. COX. [L. S.]

Witnesses:
　A. A. COOPER,
　MAY S. COOPER.

---

Copies of this patent may be obtained for five cents each, by addressing the "Commissioner of Patents, Washington, D. C."